(No Model.)
J. BEATY, Jr.
HARROW TOOTH.
No. 558,469. Patented Apr. 21, 1896.
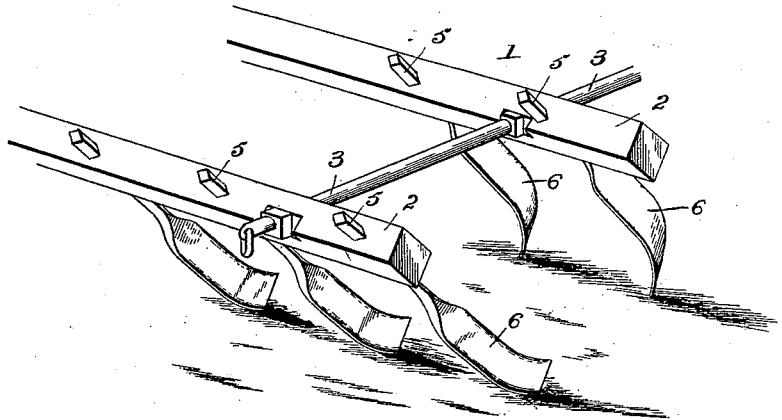
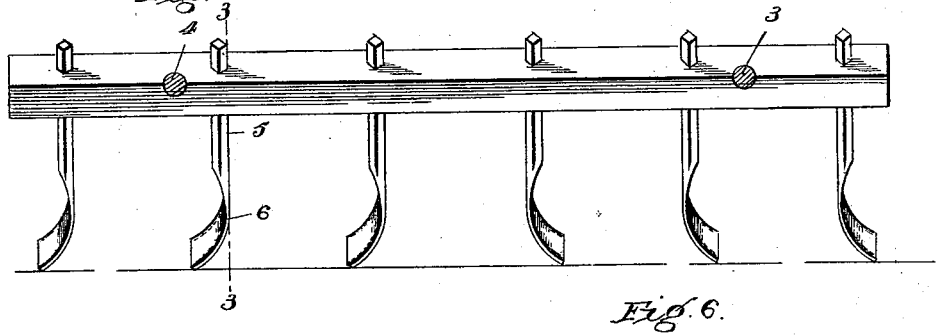
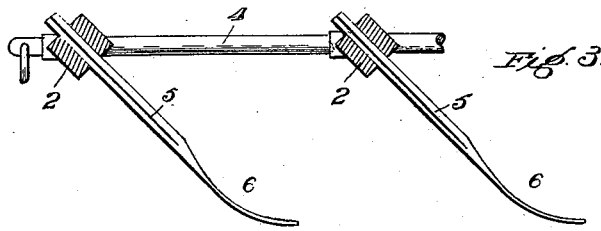
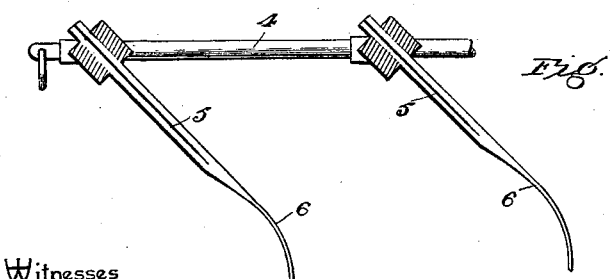
Witnesses
F. M. Johnson
Inventor
John Beaty Jr.
By his Attorneys.
C. A. Snow & Co.

UNITED STATES PATENT OFFICE.

JOHN BEATY, JR., OF OAK CENTRE, MINNESOTA.

HARROW-TOOTH.

SPECIFICATION forming part of Letters Patent No. 558,469, dated April 21, 1896.

Application filed November 17, 1894. Serial No. 529,162. (No model.)

*To all whom it may concern:*

Be it known that I, JOHN BEATY, Jr., a citizen of the United States, residing at Oak Centre, in the county of Wabasha and State of Minnesota, have invented a new and useful Harrow-Tooth, of which the following is a specification.

My invention relates to improvements in harrow-teeth; and the objects in view are to provide a harrow-tooth capable of a plurality of adjustments to adapt it as a pulverizing, scratching, or smoothing tooth, said adjustments being accomplished by arranging the teeth in different positions in the socket provided for it in a suitable framework.

Further objects and advantages of the invention will appear in the following description, and the novel features thereof will be particularly pointed out in the appended claim.

In the drawings, Figure 1 is a perspective view of a portion of a harrow having teeth constructed in accordance with my invention, said teeth being arranged for pulverizing the soil. Fig. 2 is a transverse section of the same, showing the entire width of the harrow and illustrating the fact that the teeth upon opposite sides of the center of the frame are arranged in reverse positions. Fig. 3 is a longitudinal section of a portion of a harrow on the line 3 3 of Fig. 2, showing the teeth arranged for smoothing the soil. Fig. 4 is a similar view on the same line, showing the teeth arranged for scratching. Fig. 5 is a detail view in perspective of the improved harrow-tooth detached. Fig. 6 is a detail transverse section of the blade of the tooth.

Similar numerals of reference indicate corresponding parts in all the figures of the drawings.

A portion of the frame of a harrow is shown at 1, the same consisting of transverse tooth-bars 2, connected by longitudinal stringers or draft-rods 3, and 4 represents the improved harrow-teeth which are attached to said transverse bars.

The tooth is provided with an angular stem or shank 5 and an integral flattened blade 6, which is sharpened at its lateral edges and is curved or bent near its lower end through an arc of about forty-five degrees. The sockets in the tooth-bars of the harrow are preferably at an inclination of about forty-five degrees, said inclination being downward toward the rear, whereby the teeth are inclined rearwardly toward their lower ends.

In Figs. 1 and 2 the teeth are shown arranged for pulverizing the soil, in which case they are arranged to present one of their lateral edges toward the front, whereby the forward movement of the harrow is in a direction parallel with the planes of the flattened blades of the teeth. In order to avoid side draft, the teeth upon opposite sides of the center of the framework are arranged in reverse positions, whereby the curvature of the teeth upon one side of the center of the frame is toward one side of said frame, while the curvature of the teeth upon the opposite side of the center of the framework is toward the other side. This curvature of the blades of the teeth, when they are used for pulverizing purposes, causes the lower ends of the blades to cut under the soil, and thus to a certain extent raise the surface thereof, thus loosening the soil and at the same time affecting a greater porportion of the area traversed.

When the teeth are arranged in the position shown in Fig. 3, the convex surfaces thereof rest upon the surface of the soil and thus have a smoothing or leveling effect, the lower or deflected portion moving approximately in a plane parallel with the general surface of the soil.

In Fig. 4 the teeth are shown in a position opposite to that illustrated in Fig. 3, or with their concave surfaces toward the front of the framework. In this case the lower or deflected portions of the blades are approximately perpendicular to the surface of the soil, and therefore the action is similar to that obtained by the use of an ordinary spike-tooth. The lower extremities of the blades are square, or terminate in an abrupt straight edge, to have a scratching effect upon the soil.

From the above description it will be seen that the improved harrow-tooth is capable of a plurality of positions, thus adapting it for performing different functions, and at the same time when it is used as a pulverizing tooth its construction causes it to cut under the surface and loosen the soil, besides affecting a greater area than an ordinary spike-tooth.

While I have described the improved tooth embodying my invention as applied to a harrow having wooden beams, it will be understood that they may be used also with efficiency in connection with iron-lever harrows, any suitable means for attaching the teeth to the harrow being employed.

Various changes in the form, proportion, and the minor details of construction may be resorted to without departing from the spirit or sacrificing any of the advantages of this invention.

Having thus described my invention, I claim—

The combination with the frame; of the harrow-teeth carried by the frame, each harrow-tooth consisting of a straight stem axially adjustable in the frame, and a cross-sectionally flat blade portion provided with opposite parallel beveled side cutting edges, and having a straight upper portion substantially in alinement with the stem and a lower gently curved or deflected portion disposed at an angle of approximately forty-five degrees to said straight portion of the blade, said blade being further provided at its lower extremity with a perfectly straight transverse edge disposed at direct right angles to the length of the tooth, said tooth being adapted to be arranged in a position to present either of its lateral cutting edges or either its concaved or convex surface to the front, in which former position, with the concaved surface disposed to the front, the said straight transverse edge has a direct scraping contact with the soil, substantially as set forth.

In testimony that I claim the foregoing as my own I have hereto affixed my signature in the presence of two witnesses.

JOHN BEATY, Jr.

Witnesses:
C. H. HOLMES,
A. KRALL.